United States Patent [19]
Fornay et al.

[11] Patent Number: 5,435,541
[45] Date of Patent: Jul. 25, 1995

[54] FRAME ARRANGED IN A MACHINE FOR TEMPORARILY SUPPORTING A PLATE-LIKE WORKPIECE IN A HORIZONTAL PLANE

[75] Inventors: Jean-Francois Fornay, Yverdon-Les Bains; Olivier Recordon, Prilly, both of Switzerland

[73] Assignee: Bobst SA, Lausanne, Switzerland

[21] Appl. No.: 296,980

[22] Filed: Aug. 26, 1994

Related U.S. Application Data

[63] Continuation of Ser. No. 15,623, Feb. 9, 1993, abandoned.

Foreign Application Priority Data

Feb. 10, 1992 [CH] Switzerland ............... 00386/92

[51] Int. Cl.6 ........................................... B65H 29/34
[52] U.S. Cl. .................. 271/189; 414/794.2; 414/793.9; 414/900; 271/218; 271/192
[58] Field of Search .............. 414/794.2, 793.9, 900; 271/207, 223, 217, 218, 245, 236, 189, 192

[56] References Cited

U.S. PATENT DOCUMENTS

| | | | |
|---|---|---|---|
| 3,061,303 | 10/1962 | Glaser et al. | 271/223 |
| 3,117,778 | 1/1964 | Stoever | 271/223 |
| 3,205,794 | 9/1965 | Califano et al. | 414/793.9 |
| 3,483,065 | 12/1969 | O'Brien | 414/793.9 |
| 4,281,952 | 8/1981 | Clear | 414/794.2 |
| 4,469,321 | 9/1984 | Geschwindner | 271/218 |
| 4,844,633 | 7/1989 | Greenberg | 271/189 |
| 4,938,657 | 7/1990 | Benson et al. | 414/793.9 |
| 5,090,681 | 2/1992 | Henn et al. | 271/218 |

FOREIGN PATENT DOCUMENTS

| | | | |
|---|---|---|---|
| 1036718 | 9/1953 | France | 271/218 |
| 2457239 | 7/1981 | France | 271/189 |

*Primary Examiner*—H. Grant Skaggs
*Attorney, Agent, or Firm*—Hill, Steadman & Simpson

[57] ABSTRACT

A frame is designed for temporarily supporting a horizontal plate-like workpiece until it undergoes a vertical translation between guiding and squaring stops, which frame is located in a machine. The frame comprises lateral retractable supporting surfaces which are either edges of a horizontal flat bar or sides of a horizontal flat bar. When the supporting surfaces are the edges of the horizontal flat bar, the bar is mounted so that it can be moved from a straight line position retracted from the supporting of the sheet to a curved position for supporting the edge of the sheet. The bars can also be positioned utilizing the side and are moved either by pivoting or by a four-bar linking arrangement between the retracted and engaged positions. Finally, the bars can be mounted for rotation along one edge between the engaging and retracted positions.

9 Claims, 4 Drawing Sheets

FRAME ARRANGED IN A MACHINE FOR TEMPORARILY SUPPORTING A PLATE-LIKE WORKPIECE IN A HORIZONTAL PLANE

This is a continuation of application Ser. No 08/015,623, filed Feb. 9, 1993 now abandoned.

BACKGROUND OF THE INVENTION

The present invention is directed to a variable-geometry frame which is designed to temporarily support a horizontally disposed plate-like workpiece, such as a sheet of paper or board, that is subsequently to undergo a vertical translational movement between guiding and squaring stops and which frame is located, for instance, within a delivery station were the workpieces are to be piled.

Such a delivery station is located at the end of a die-cutting machine as a last station. A sheet of paper or board, when cut to a proper size and separated from the waste bits, is taken into the last station by a gripper bar in order to be dropped accurately on top of a pile once the gripper bar has been opened or the front waste bit is cut by means of a guillotine.

A sheet can include several blanks arranged side-by-side or successively and permanently attached to one another by linking points. It is absolutely necessary to maintain all the blanks in a plane during the action of the guillotine and to open the supporting frame in a synchronized manner in order to release the sheet which is to drop with a uniform movement.

On the present machines, the process of maintaining the sheets in a plane is achieved by means of a retractable rear shelf as well as one or several horizontal laterally disposed tongues, which are able to pivot with a swinging or mowing movement. Since this type of lateral maintenance holds the blank over a short surface and, in most cases, at inappropriate areas of the sheet, this type of lateral maintenance has proven to be unsatisfactory. One sees too frequently the collapsing of the sheet, the premature separation of the blanks, or even the unsynchronized dropping of the workpieces, which leads to a bad piling up. The production speed and quality are, hence, strongly affected. Moreover, the opening and closing mechanisms of the pivoting supports are relatively complex and, therefore, expensive to manufacture.

SUMMARY OF THE INVENTION

An object of the present invention is to provide advice with a frame designed for the temporary support of sheets, which ensure the earliest possible taking care of the sheet when introduced into the station, allows a proper transport, ensures an entire and efficient maintenance during the end of the run and during the action of the guillotine and, finally, a perfectly synchronized opening in order to ensure an accurate dropping of the sheet into a pile.

Another object consists of providing a device of the above-mentioned type, whose conception is particularly simplified in order to reduce the manufacturing costs and augment the acting speed through the reduced inertia of the components used.

These objects are achieved by means of a supporting frame, each of the two lateral supports consisting of horizontal flat supporting surfaces provided on longitudinally extending bars along the whole length of the frame, and whose shifting movement of the bars between an advanced position to support the sheet and a retracted position allowing the vertical dropping of the sheet. This movement is ensured by actuator means acting on the flat bar, either directly or possibly with the help of a lever.

Owing to the reduced inertia of the flat bars and to the quasi-direct connection with an actuator, it is possible to set the lateral support instantly in the advanced or engaged position during the arrival of the sheet that is then progressively sufficiently supported by these lateral support surfaces of the flat bars. The sides of the sheet, particularly so the creasing or separating lines of the blanks, are permanently maintained on the support surfaces of these lateral bars in order to avoid the accidental concertina folding or accordion folding of the sheets. Moreover, the rear shelf has proven to be unnecessary and can, therefore, be eliminated. Finally, the acting swiftness of these lateral supports enable an excellent synchronization of the successive movements of the sheets.

In each of the following embodiments, the flat bars have a rectangular cross section with a length and width so that the edge surface of the bar is substantially less than the sides surfaces of the bar. According to a first embodiment, the flat bars are arranged in such a way that the sides lie in a substantially vertical direction and the edge forms the horizontal supporting surface. The ends of the bar are mounted to allow movement so that when the bar is bent by the action of the actuator means, the center portion of the bar can be shifted from a retracted position to an advanced or engaged position to enable the edge to support the edge of the sheet. Preferably, the actuator means is mounted for movement in a horizontal direction.

Preferably, each of the bars has a vertically extending oblong orifice arranged to extend from one edge to the other, and this orifice receives a vertical axle or holding pin which is permanently fitted on the structure of the station. Alternatively, each end can be slid in an aperture of a strap whose vertical rectangular section has a constant height identical to the end of the bar and a length increasing in the direction of the bar. Both of these arrangements enable the bar to shift in its mounting or connection to the front as the bar is being bent or flexed.

Advantageously, the bars are made of a synthetic material, such as plastic, and more specifically of a polyamide or other material having a modulus of elasticity that falls in a range of between 900N/mm$^2$ and 2000N/mm$^2$.

According to a second embodiment, the flat bar is arranged in such a way that the sides will be positioned in the horizontal plane to form the horizontal supporting surface. One end of each of the bars is pivotable around a vertical axis, whereas the other end is directly advanced or retracted by a linear actuator mounted with movement in the horizontal direction. Advantageously, the downstream end of the bar is the pivoted end so as to ensure a progressive dropping of the sheet from the upstream edge toward the downstream edge.

According to a third embodiment, the flat bar is arranged in such a way that the sides of the bar form the horizontal supporting surface, and one of its ends is linked to one of the branches of a lever, whose other branch can be shifted by means of a linear actuator. The other end of the bar is linked to a connecting rod. The lever and the actuator are arranged almost in the same horizontal plane as the supporting surface. Thus, if the connecting rod and the first branch of the lever have an angle of, for example, 45° with the bar while in the advanced supporting position, its retraction can be effectuated essentially under the form of a linear translational horizontal movement orthogonally to the length of the bar, and this retraction consists only of a slight mowing or shifting movement in a direction extending parallel to the length of the bar.

According to a fourth embodiment, the flat bar is rotatably movable around an axis that extends parallel to its overall length, which axis is located adjacent the outer lengthwise edge of the bar, and there is either a rotary actuator directly connected to the bar on the extension of the rotary axis or a cross linear actuator acting on a branch protruding from the bar at the point of the axis of rotation. Thus, the bar can rotate from a position with the supporting surface lying in a horizontal plane to a vertical position to allow dropping of the blank.

In all cases, the actuator can be a double-acting advance and retraction actuator. It is also a consideration given to costs that the actuator should, preferably, have a single-acting linear advance when actuated and be provided by pull-back means or spring that extend parallel to the actuator, which pull-back means will cause retracting the bar to the retracted or resting position. In the case of a rotary single-acting actuator, it would be wise to add a torsion pull-back means, such as a helical spring.

In all cases also, the ends of the bars, as well as the corresponding actuators, can be installed on supporting pieces, which are engaged on axles along which they can be shifted according to the size of the plate-like workpiece.

If required, a retractable shelf completing the frame at the back can also consist of a flexible bar having a horizontal supporting surface, the position of its central part being also controlled by positioning means, such as actuator means, with a double-acting input and output.

Other advantages and features of the invention will be readily apparent from the following description of the preferred embodiments, the drawings and claims.

DESCRIPTION OF THE PREFERRED EMBODIMENTS

Figure 1:
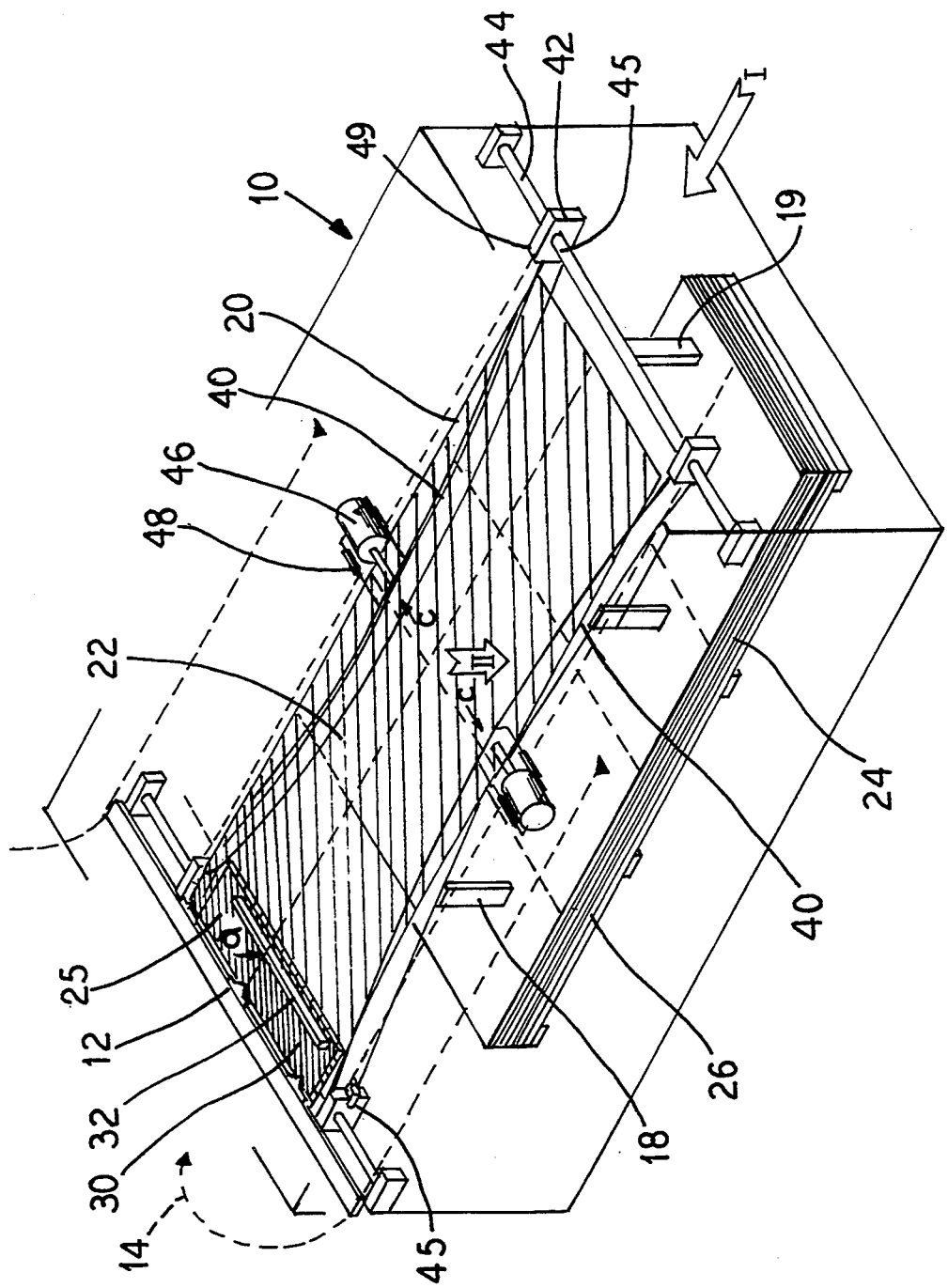
FIG. 1 is a schematic perspective view of a first embodiment of the supporting system of the frame in accordance with the present invention.

The principles of the present invention are particularly useful when incorporated in a delivery station, generally indicated at 10 in FIG. 1. A delivery station 10 will receive sheets 20, which are carried in a horizontal translational direction shown by the arrow 1 by means of gripper bars 12, which are on endless chains, which are schematically illustrated at 14. Once the sheets 20 have arrived against a front stop (not represented), they are released by the grippers 12 and a front edge 25 of the sheet is cut along a line called a "first rule" by means of a guillotine 32 acting in coaction with a guillotine table 30. The sheet is then dropped in a direction of arrow II in a vertical translation, and this dropping action is guided by means of stops or sorters 18 along the lateral sides of the machine and Stop or Sorter 19 on the rear of the machine. As a result, the sheet 20 will drop on top of a pile 24, which is built-up on a retractable pallet 26.

Due to the sheet 20 being pre-cut, it will include several blanks 22, which are arranged side-by-side or one after another in a row. These blanks 22 are only linked together with bridges of material. The sheets, thus, are extremely fragile and needs to be supported properly all along their transfer into the station 10 and during the cutting along the first rule in order to be maintained in a horizontal plane until they are dropped. To this aim, the frame of the device according to the first embodiment of the invention consists of two lateral bars 40 which extend along the travelling direction indicated by the arrow I and are shiftable crosswise to this travelling direction.

Each of the bars 40 is made in such a way as to be relatively flexible in the horizontal plane but sufficiently rigid in the vertical plane. As an example, such a bar can be made of a plastic material having a modulus of elasticity within a range of between $900N/mm^2$ and $2000N/mm^2$. Such a material can be a polyamide with a reference "6.6" or "PE UHMW". The bar will have a vertical rectangular cross section of, for example, 5.5 mm and a thickness of 0.7 mm.

As illustrated, each of the bars is mounted with its edge forming the horizontal supporting surface. Each end of the bars 40 has a cross horizontally extending hook 45, which is orientated toward the outside of the station. This hook 45 has a vertical oblong orifice arranged to extend lengthwise. The hook can be held in a supporting piece 42 by means of a vertical pin 49, and this connection allows a certain lengthwise shifting necessary for the future flexing of the bar. The supporting pieces 42 are shiftable along the rods or axles 44. As an alternative, every end of the bar 40 can be engaged in an aperture of a strap, which, when seen in a horizontal cut, would have a conical section whose base would be oriented or pointing toward a center part of the bar and whose inner height will correspond to the height of the bar. Thus, the bar can pivot slightly in either mounting.

In other respects, the central part of each bar 40 is held by means of an actuator rod of a pneumatic actuator 46, which will extend orthogonally to the direction of the bar and is situated in the same horizontal plane. When actuated, the single-acting actuator 46 will shift the bar from an initial position in which the bar is in a straight rectilinear arrangement according to the dotted line in the Figure toward an output position where it is flexed, for instance by 30 mm. This stroke is sufficient to hinder the dropping of the sheet 20. During the flexion, each end of the bar is able, if necessary, to slide slightly in its corresponding supporting piece 42 due to the connecting oblong orifice and fastening pin 49 or the strap arrangement. The retraction of the bar to its initial position as indicated by arrow c is achieved by means of a tension spring 48 arranged to extend parallel to the actuator 46.

The actuator 46 may be a piston made of a plastic material and of a rigid metal body. The fixture or connection of the piston to the plastic bar 40 can then be achieved with the help of a metal insertion or a special screw for thermal stiffening or thermal setting materials. The advantage of this device for positioning the bar is the reliability which occurs by the simple conception of the components and, not the least, their reasonable cost. If required, this actuator 46 and the pull-back means 48 can be replaced by one pneumatic double-acting actuator.

Thus, in the embodiment of FIG. 1, each of the bars 40 can be bent from a straight line position illustrated in dot-lines, wherein the edges are retracted from a supporting position for the sheet 20 to an engaging or supporting position with the edges disposed under the edges of the sheet.

Figure 2:
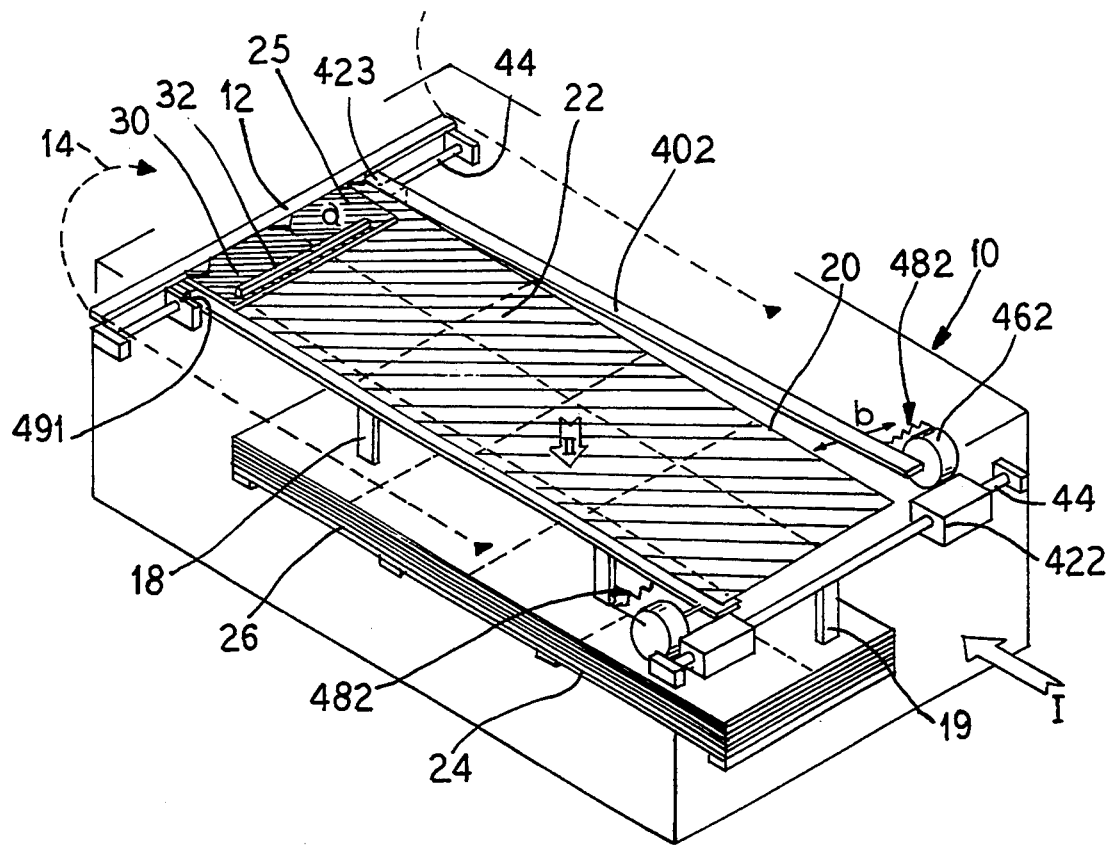
FIG. 2 is a schematic perspective view of a second embodiment of a supporting system of the frame in accordance with the present invention, wherein the supporting bars are pivotably mounted at the downstream end and can be shifted from an engaging position to a retracted position.

A second embodiment of the supporting arrangement is illustrated in FIG. 2, with components similar to the previously-described components having the same reference numbers. In this embodiment, the two lateral bars 402 for supporting the sheet 20 are arranged with the sides providing the support surfaces. In other words, the bars 402 have been rotated 90° relative to the bars 40 of FIG. 1. The downstream ends of each of the bars 402 are rotatably mounted on vertical axes 491, which are permanently fitted on the supporting pieces 432, which are mounted so as to be able to slide on cross axles or supports 44. On the other hand, the upstream ends are held by single-acting linear actuators 462, which actuators are permanently attached to supporting pieces 422, which are able to slide on a cross axle or bar 44. A tension or draw spring 482 extends parallel to the actuators 462 and is connected to the bar 402 and to a corresponding body of the actuator or to an element that is permanently attached to the actuator.

When the actuator is actuated, as it is illustrated in the lower left-hand side of the Figure, it will push the bar 402 forward in a so-called closed or engaged position toward the inner side of the station, and this is against the force or traction of the spring 482. The bar 402 is then in a position to support the lateral edge of a sheet 20 during its entire motion into the station and during the removal of the front waste bit 25 by means of a guillotine 30 and guillotine plate 32. The actuators 462 are then deactivated and the springs 482 will then pull the upstream ends of the bars in the direction of the arrows b to the position illustrated by the bar 402 in the upper right-hand side of FIG. 2. The sheet 20 is then dropped in the direction of arrow II progressively from the upstream edge and guided by the rear stop or sorter 19 and then by the stops 18. There, again, the inertia of the moving pieces is particularly reduced, which allows quick and well-synchronized action.

Figure 3:
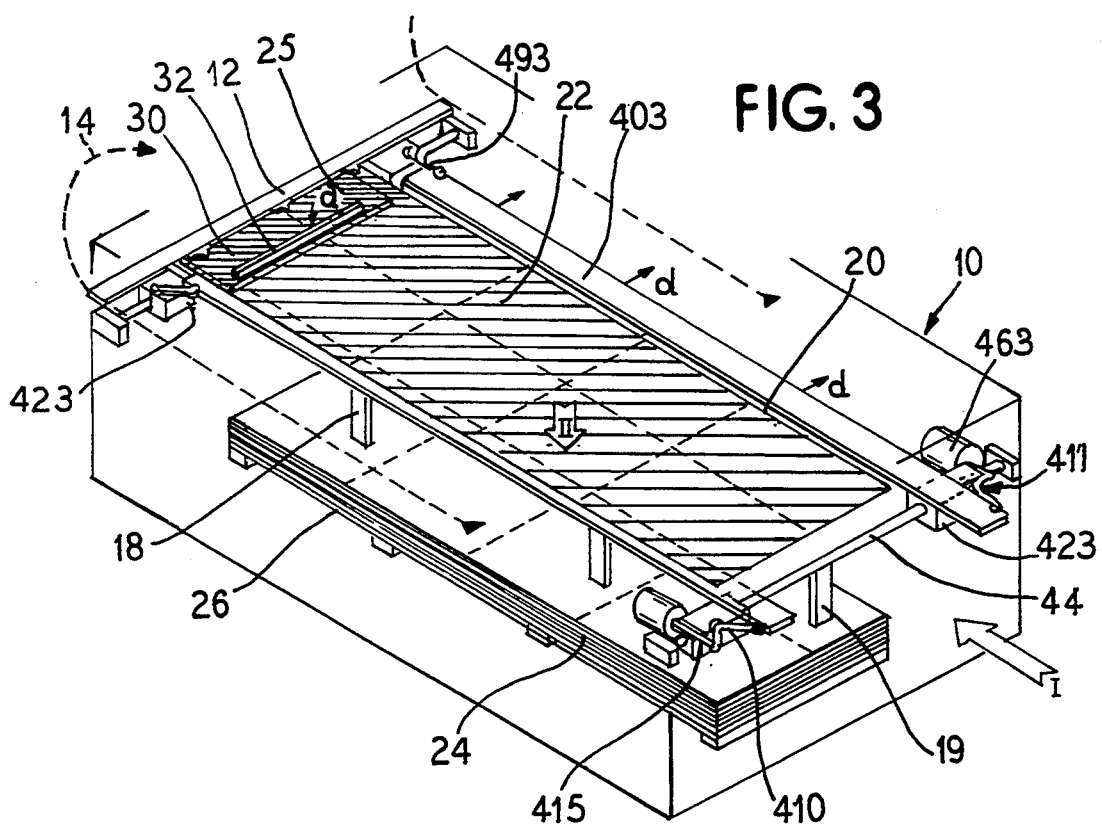
FIG. 3 is a schematic perspective view of a third embodiment of the supporting system of the frame in accordance with the present invention having shifting bars which are moved in a horizontal direction with an orthogonal translation.

A third embodiment of the supporting system is illustrated in FIG. 3 in which the lateral supporting bars 403 are also arranged with their sides forming the horizontal supporting surfaces. These bars 403 are supported on the upstream and downstream ends by supporting pieces 423. The downstream end of each of the bars is linked to its corresponding supporting piece 423 by a horizontally positioned connecting rod 493, which makes an angle of 45° with the bar when the latter is in the so-called closed or engaged position, as illustrated in the lower left-hand side of FIG. 3. The other end, which is the upstream end of the bar, is connected to a first branch 411 of a lever mounted for pivotable movement on the underlying supporting piece 423. The lever is arranged in such a way that the first branch will be permanently parallel to the connecting rod 493. The lever has a second branch 410, which is linked to the output rod 415 of the actuator 463, which actuator, in the present example, is mounted on the supporting piece 423 and extends parallel to the bar 403. The orientation of the actuator depends, in fact, on the angle existing between the two branches 410 and 411 of the lever. As illustrated, this is a right angle relationship.

The connecting rod 493, the bar 403 and the first branch 411 of the lever are situated in the same plane and the connecting rod is always parallel to the first branch. These elements make up a permanent parallelogram or four-bar linkage. Therefore, when the output rod 415 of the actuator pulls the second branch 410 of the lever when the bar is in the so-called closed or supporting position, as illustrated in the lower left-hand side of FIG. 3, the rod causes the second branch 410 to rotate, which action is repeated by the connecting rod 493 and, thus, the bar will be retracted in a direction of the arrows d with an essentially uniform orthogonal translation with a slight shifting or mowing movement in a direction extending parallel to the length of the bar. This movement will occur until the so-called open position is reached, as illustrated in the upper right-hand side of FIG. 3, and this movement authorizes a balanced drop in the direction of arrow II for the sheet 20 at a certain moment. The retraction of the bars to the so-called closed position is achieved by means of the actuator 463 pushing forward the first branch 411 of the lever. Thus, the actuator 463 is a double-acting actuator.

Figure 4:
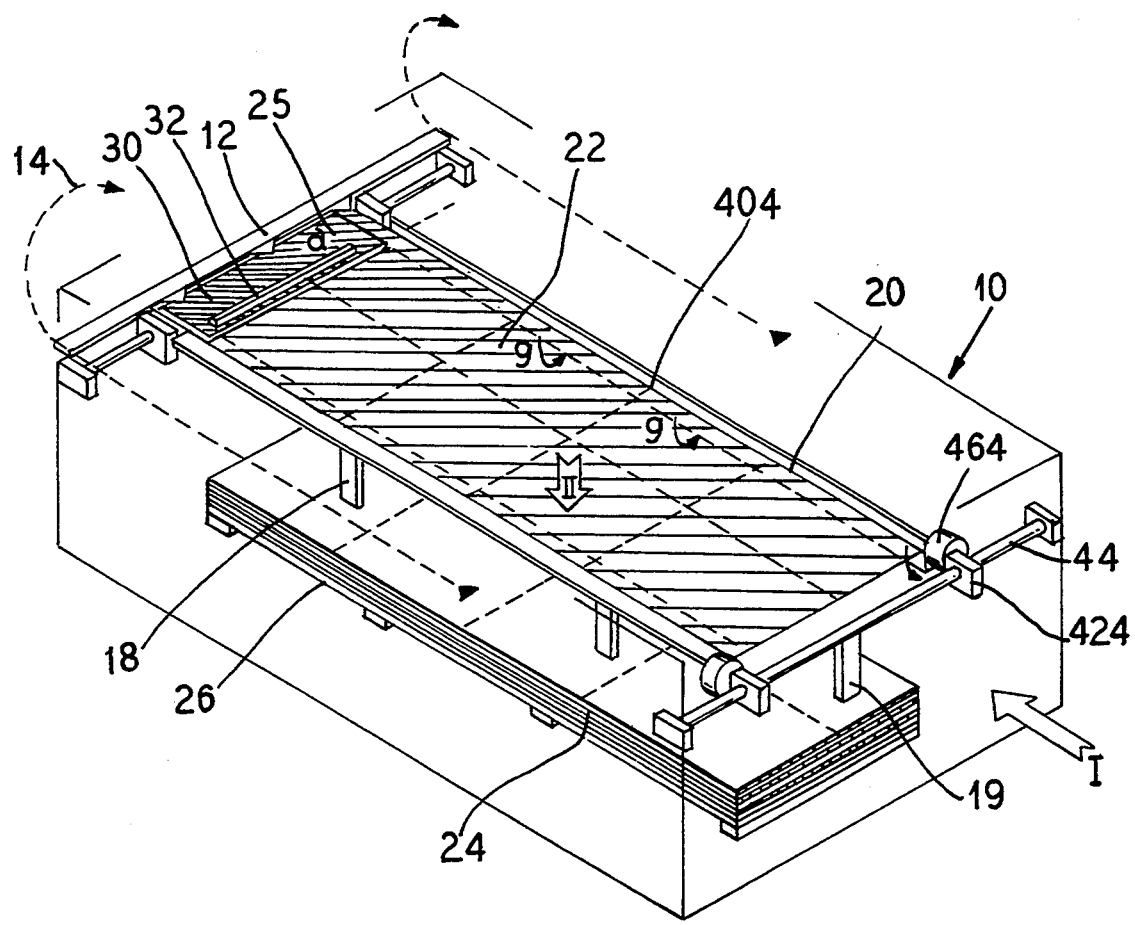
FIG. 4 is a schematic perspective view of a fourth embodiment of the supporting system of the frame in accordance with the present invention, wherein the supporting bars are mounted for rotation along a longitudinal axis between a position with the surfaces extending in a horizontal direction to a position with the surface extending in a vertical direction.

A fourth embodiment of the supporting arrangement is illustrated in FIG. 4 and has lateral supporting bars 404, which are held for rotary movement along the lengthwise axis close and parallel to its outer edge, on the one hand, on supporting pieces 424, and, on the other hand, by the output axis of a rotary actuator 464, itself permanently mounted on the upper support piece 424.

As may be easily understood, the actuator 464 straightens the bar 404 in order to have it flat when the sheet 20 arrives, as illustrated in the lower left-hand side of FIG. 4, and then, owing to a rotation in the direction of arrows g, turns the bar downward until the vertical position is reached, as illustrated by the upper right-hand side of the same Figure. In the position illustrated in the upper right-hand side, which is the retracted position, a homogeneous drop in the direction of arrow II of the sheet is then guided by the member 18 and 19. The actuator can have a double or single action. A helical spring will ensure the retraction of a so-called operating rest position when using a single-acting actuator.

As may be understood from each of these Figures, the supporting pieces 42 are, themselves, fitted on positioning axles 44, which allows positioning the bars 40 either toward one another or away from one another, depending on the width of the sheet 20 being processed.

Advantageously, the device with endless belts or other allows to set simultaneously the supporting pieces 42, but maintain a symmetry with regard to the medium plane of the station 10.

Figure 5:
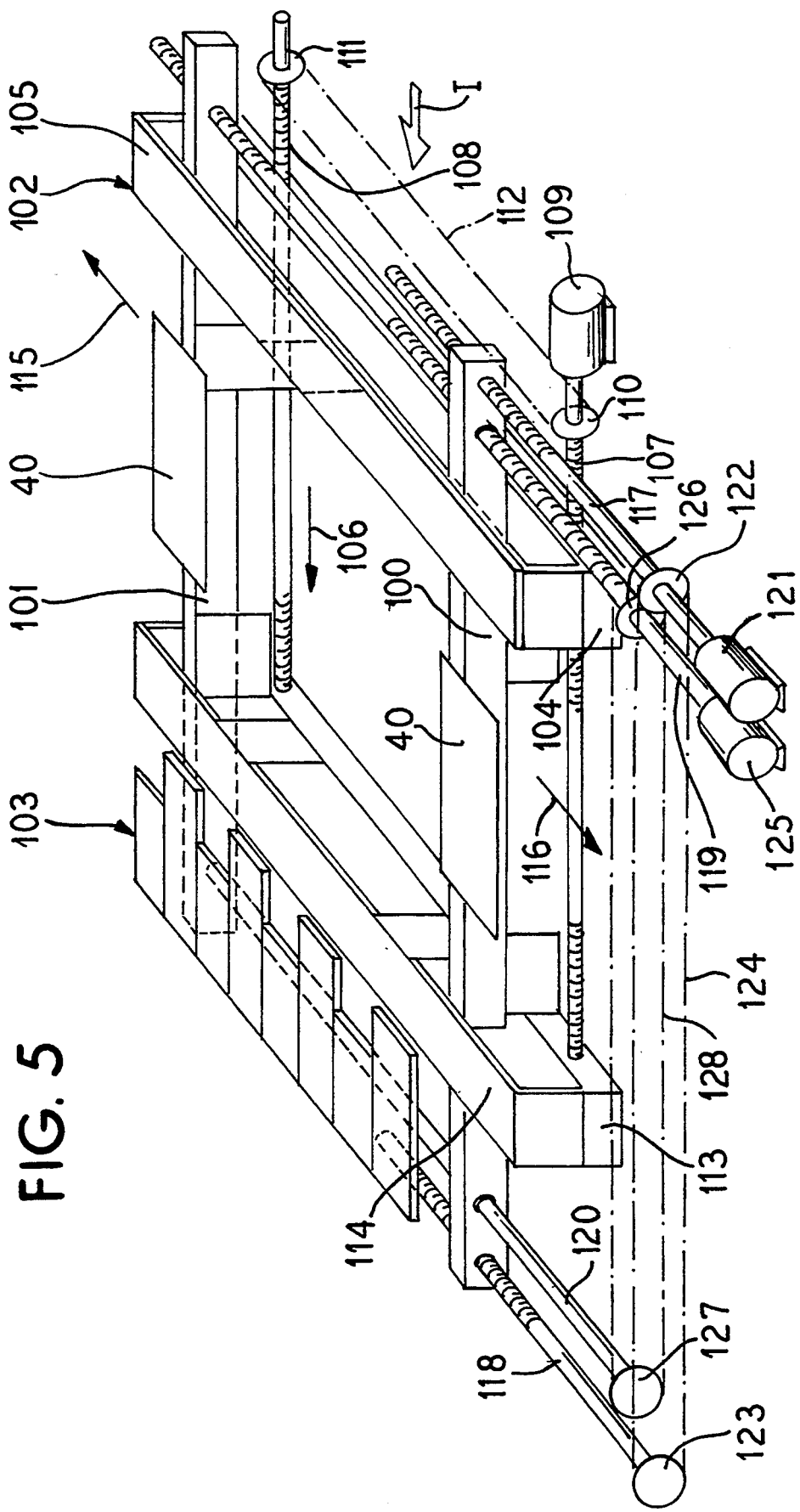
FIG. 5 is a perspective view of a stripping frame utilizing the supporting system of the present invention.

If required, the frame can be closed at the back with the shelf, as illustrated in FIG. 5, which can be actuated forward and backward by a pneumatic double-acting actuator, which is not illustrated. This assembly could also be positioned more or less forward beforehand, according to the size of the sheet. It could also be envisioned to equip the shelf with a bar of plastic material engaged between two lateral straps, which bar is flexed by a central pneumatic actuator similar to the arrangement illustrated in FIG. 1.

An embodiment of the stripping frame equipped with bars 40, such as those described hereinabove, is shown in FIG. 5. This frame has two lengthwise beams 100 and 101, which make up its lateral walls, and a crossbar 102 making up an upstream wall with regard to the travelling direction of the plate-like workpiece shown by the arrow I. The downstream wall of this frame is made up by a guillotine table 103. The crossbar 102 will have a stance 104 on which a slideway 105 is provided for guiding the lengthwise beams 100 and 101. The guillotine table 103 is made up in the same way and also to guide the other ends of the lengthwise beams 100 and 101 by means of a slideway 114. The guillotine table 103 is not movable, whereas the crossbar 102 can be shifted in a direction shown by the arrows 106 under the effect of setting screws 107 and 108. The movement of the setting screws 107 and 108 is obtained by means of a motor speed control 109 acting on the setting screw 107, which is arranged so as to transmit its rotary motion to the setting screw 108 by means of sprocket wheels 110 and 111, which are linked by a chain 112. The setting screws 107 and 108 engage in threads machined in the stand 104 and are guided at their other end into bearings fitted on the stand 113 of the guillotine table 103.

The lengthwise beams 100 and 101 are guided in the slideways 105 and 114 fitted on the stands 104 and 113, respectively, and are laterally shiftable in the direction shown by the arrows 115 and 116 under the action of the setting screws 117, 118, 119 and 120. The setting screws 117 and 118 control the shifting of the lengthwise beam 100 and the setting screws 119 and 120 control the shifting of the lengthwise beam 101. A motor speed control 121 drives the setting screw 117, which will transmit its rotary movement to the screw 118 by means of toothed wheels or sprockets 122 and 123, which are linked by a chain 124. A second motor speed control 125 will drive the screw 119, which transmits its rotary movement to the screw 120 by means of sprockets 126 and 127 linked by a chain 128.

This frame allows a progressive setting from the smallest to the largest size of the plate-like workpieces or sheets 20 without any dismantling.

Moreover, this frame with a variable geometry can be installed in an intermediate position in order to support a secondary pile of sheets 20 made when a full pallet 26 is being replaced with an empty one, the latter being brought almost to the level of the intermediate frame before the frame is reopened.

Although various minor modifications may be suggested by those versed in the art, it should be understood that we wish to embody within the scope of the patent granted hereon all such modifications as reasonably and properly come within the scope of our contribution to the art.

We claim:

1. A device for temporarily supporting a plate-like workpiece in a horizontal plane in a machine, which workpiece is subsequently destined to be dropped in a vertical direction between guiding and squaring stops located within the machine, said device including a frame; a pair of flat bars, each bar having a length to extend over most of the whole length of the frame and having an edge forming a planar support surface; mounting means for mounting the flat bars in the frame to extend along a travelling direction of the workpiece with an end of each bar being mounted for sliding movement and for movement of the planar support surfaces in a horizontal plane between a position with said support surface of the bar in a retracted, withdrawn position to an engaged position with the support surface providing support for said sheet; and actuator means engaging a center part of each bar to cause flexing of the bar to shift the support surface between the retracted and engaged positions.

2. A device according to claim 1, wherein the ends of the bars have vertical oblong orifices arranged lengthwise, said orifices being engaged on holding pins which permanently fit on a structure of the mounting means.

3. A device according to claim 1, wherein each of the bars is made of a synthetic material having a modulus of elasticity in a range of between $900N/mm^2$ and $2000N/mm^2$.

4. A device according to claim 3, wherein the bars are made of polyamide.

5. A device according to claim 1, wherein each end of the bar is slidably held by said mounting means.

6. A device for temporarily supporting a plate-like workpiece in a horizontal plane in a machine, which workpiece is subsequently destined to be dropped in a vertical direction between guiding and squaring stops located within the machine, said device including a frame, a pair of flat bars with each bar having a length to extend over most of the whole length of the frame and having a planar support surface, mounting means for mounting the flat bars in the frame to extend along a travelling direction of the workpiece and for movement of the planar support surfaces in a horizontal plane between a position with said support surface of the bar in a retracted, withdrawn position to an engaged position with the support surface providing support for said sheet, and actuator means for shifting the flat bars between the two positions, said mounting means having support pieces for mounting ends of the bars and actuators of the actuator means, said support pieces being engaged on axles for movement therealong to enable shifting of the bars according to the size of the plate-like workpiece.

7. A device according to claim 6, wherein the support surfaces are the sides of the two flat bars, each of said flat bars being pivotably mounted at one end by a connecting rod and pivotably mounted at the other end by a first branch of a lever extending parallel to the connecting rod, said lever having a second branch extending at an angle to the first branch, said actuating means including an actuator with an actuator rod connected to the second branch so that shifting of the actuator rod causes the bar to move in a parallel direction at right angles to the length of the bar between said positions.

8. A device for temporarily supporting a plate-like workpiece in a horizontal plane in a machine, which workpiece is subsequently destined to be dropped in a vertical direction between guiding and squaring stops located within the machine, said device including a frame; a pair of flat bars, each bar having a length to extend over most of the whole length of the frame and having a planar support surface being formed by a side of the bar; mounting means for mounting the flat bars in the frame to extend along the travelling direction of the workpiece with one end of each bar being pivotable around a vertical axis for movement of the planar support surfaces in a horizontal plane between a position with said support surface of the bar in a retracted, withdrawn position to an engaged position with the support surface providing support for said sheet; and actuator means for shifting the flat bars between the two positions, said actuator means including a horizontal linear actuator coacting with a spring, said spring and actuator being connected to the other end of each bar to pivot the bar between the retracted position and the engaged position.

9. A device for temporarily supporting a plate-like workpiece in a horizontal plane in a machine, which workpiece is subsequently destined to be dropped in a vertical direction between guiding and squaring stops located within the machine, said device including a frame; a pair of flat bars, each bar having a length to extend over most of the whole length of the frame and having a side forming a planar support surface; mounting means for mounting the flat bars in the frame to extend along a travelling direction of the workpiece and for movement of the planar support surfaces in a horizontal plane between a position with said support surface of the bar in a retracted, withdrawn position to an engaged position with the support surface providing support for said sheet, said mounting means pivotably mounting one end of each flat bar by a connecting rod and pivotably mounting the other end of each flat bar with a first branch of a lever extending parallel to the connecting rod, said lever having a second branch extending at an angle to the first branch; and actuator means for shifting the flat bars between the positions, said actuator means including an actuator with an actuator rod connected to the second branch so that shifting of the actuator rod causes the bar to move in a parallel direction at right angles to the length of the bar between said positions.

* * * * *